(12) United States Patent
Lu et al.

(10) Patent No.: US 11,503,441 B2
(45) Date of Patent: Nov. 15, 2022

(54) SYSTEM INFORMATION TRANSMISSION METHOD AND DEVICE

(71) Applicant: ZTE CORPORATION, Shenzhen (CN)

(72) Inventors: Zhaohua Lu, Shenzhen (CN); Kun Liu, Shenzhen (CN); Guanghui Yu, Shenzhen (CN); Yijian Chen, Shenzhen (CN); Feng Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/075,302

(22) PCT Filed: Jan. 22, 2017

(86) PCT No.: PCT/CN2017/072056
§ 371 (c)(1),
(2) Date: Aug. 3, 2018

(87) PCT Pub. No.: WO2017/133519
PCT Pub. Date: Aug. 10, 2017

(65) Prior Publication Data
US 2019/0053018 A1 Feb. 14, 2019

(30) Foreign Application Priority Data
Feb. 3, 2016 (CN) .......................... 201610075946.3

(51) Int. Cl.
*H04W 4/20* (2018.01)
*H04W 4/12* (2009.01)
(Continued)

(52) U.S. Cl.
CPC ............... *H04W 4/20* (2013.01); *H04W 4/12* (2013.01); *H04W 48/10* (2013.01); *H04W 48/12* (2013.01); *H04W 72/04* (2013.01); *H04W 48/16* (2013.01)

(58) Field of Classification Search
CPC ..... H04W 48/10; H04W 48/12; H04W 48/16; H04W 4/12; H04W 4/20; H04W 72/04
See application file for complete search history.

(56) References Cited

U.S. PATENT DOCUMENTS 9,191,858 B1 * 11/2015 Sung ................... H04W 36/22
2005/0164683 A1   7/2005 Roberts et al.
(Continued)

FOREIGN PATENT DOCUMENTS

CN    101123818 A    2/2008
CN    101359943 A    2/2009
(Continued)

OTHER PUBLICATIONS

International Search Report in international application No. PCT/CN2017/072056, dated Mar. 3, 2017, 2 pgs.
(Continued)

*Primary Examiner* — Ayaz R Sheikh
*Assistant Examiner* — Debebe A Asefa
(74) *Attorney, Agent, or Firm* — Perkins Coie LLP

(57) ABSTRACT

A system information transmission method and device. The system information transmission method comprises: generating, by a first communication node, first system information indicative of indication information corresponding to second system information, wherein the second system information is used to assist a second communication node to access a system; transmitting to the second communication node the first system information; receiving, by the second communication node, the first system information transmitted from the first communication node; receiving, according to the indication information in the first system information, the second system information; and accessing, according to the second system information, the system.

20 Claims, 13 Drawing Sheets

(51) Int. Cl.
*H04W 48/12* (2009.01)
*H04W 48/10* (2009.01)
*H04W 72/04* (2009.01)
*H04W 48/16* (2009.01)

(56) References Cited

U.S. PATENT DOCUMENTS

| | | | |
|---|---|---|---|
| 2007/0053383 | A1 | 3/2007 | Choi et al. |
| 2007/0064669 | A1* | 3/2007 | Classon ............... H04L 1/1822 370/347 |
| 2009/0274086 | A1* | 11/2009 | Petrovic ............... H04W 48/10 370/312 |
| 2010/0003986 | A1 | 1/2010 | Chen |
| 2010/0226389 | A1 | 9/2010 | Cho |
| 2014/0036812 | A1 | 2/2014 | Malladi et al. |
| 2015/0085717 | A1 | 3/2015 | Papasakellariou et al. |
| 2015/0245279 | A1 | 8/2015 | Choi et al. |
| 2016/0135177 | A1 | 5/2016 | Ahn et al. |
| 2016/0234859 | A1* | 8/2016 | You ...................... H04L 5/0048 |
| 2016/0234860 | A1* | 8/2016 | Shimezawa .......... H04L 5/0053 |
| 2016/0270013 | A1* | 9/2016 | Soriaga ............... H04W 56/001 |
| 2016/0353473 | A1 | 12/2016 | Chen et al. |
| 2017/0099126 | A1 | 4/2017 | Yoo et al. |
| 2017/0311233 | A1* | 10/2017 | Du ........................ H04W 36/24 |
| 2018/0007673 | A1* | 1/2018 | Fwu ..................... H04L 5/0092 |

FOREIGN PATENT DOCUMENTS

| | | |
|---|---|---|
| CN | 101873669 A | 10/2010 |
| CN | 101873694 A | 10/2010 |
| CN | 103716856 A | 4/2014 |
| CN | 103763755 A | 4/2014 |
| CN | 104811264 A | 7/2015 |
| EP | 1986367 A1 | 10/2008 |
| EP | 1799003 B1 | 2/2010 |
| EP | 3585109 A1 | 12/2019 |
| EP | 3091789 B1 | 4/2020 |
| EP | 3361687 B1 | 1/2021 |
| TW | I337016 B | 2/2011 |
| WO | 2010105403 A1 | 9/2010 |
| WO | 2012/103765 A1 | 8/2012 |
| WO | 2015005724 A1 | 1/2015 |
| WO | 2015109609 A1 | 7/2015 |
| WO | 2015113391 A1 | 8/2015 |
| WO | 2016004634 A1 | 1/2016 |

OTHER PUBLICATIONS

English Translation of the Written Opinion of the International Search Authority in international application No. PCT/CN2017/072056, dated Mar. 3, 2017, 4 pgs.
Supplementary European Search Report in European application No. 17746839.4, dated Dec. 13, 2018, 7 pgs.
Huawei et al., "[Draft] WF on NB-MIP design," 3GPP TSG RAN WG1 NB-IoT Ad-Hoc Meeting, Budapest, Hungary, R1-160214, 2 pages, Jan. 18-20, 2016.
Huawei et al., "NB-IOT—downlink physical layer concept description," 3GPP TSG RAN WG1 Meeting #83, Anaheim, U.S.A., R1-156462, 11 pages, Nov. 15-22, 2015.
Interdigital, "NB-PBCH design for NB-IoT," 3GPP TSG RAN WG1 NB-IoT Ad-Hoc Meeting, Budapest, Hungary, R1-160135, 3 pages, Jan. 18 -20, 2016.
Samsung, "Broadcast Channel Design," 3GPP TSG RAN WG1 Meeting #83, Anaheim, U.S.A., R1-156805, 5 pages, Nov. 15-22, 2015.
Panasonic, "MIB-PBCH for eMTC," 3GPP TSG RAN WG1 Meeting #82bis, Malmo, Sweden, R1-155759, 4 pages, Oct. 5-9, 2015.
Samsung, "Considerations of Downlink Design," 3GPP TSG RAN WG1 Meeting #83, Anaheim, U.S.A., R1-156804, 5 pages, Nov. 15-22, 2015.
Samsung, "Discussion of Operation Mode Indication," 3GPP TSG RAN WG1 NB-IoT Ad-Hoc Meeting, Budapest, Hungary, R1-160146, 3 pages, Jan. 18-20, 2016.
Samsung, "SIB1 Transmission for Low Cost UEs," 3GPP TSG RAN WG1 #82bis, Malmo, Sweden, R1-155436, 4 pages, Oct. 5-9, 2015.
Huawei, et al., "MTC SIB Transmission," 3GPP TSG-RAN WG2 #91bis, R2-154361, Malmo, Sweden, Oct. 5-9, 2015, 4 pages.
Ericsson, "MIB for Rel-13 low complexity and coverage enhanced UEs," 3GPP TSG-RAN WG2 #91bis, R2-154785, Malmo, Sweden, Oct. 5-9, 2015, 6 pages.
Interdigital, "Remaining Issues on System Information," 3GPP TSG RAN WG1 Meeting #83, R1-157432, Anaheim, USA, Nov. 15-22, 2015, 2 pages.
Qualcomm Incorporated, "System Information," 3GPP TSG RAN WG1 #83, R1-157027, Anaheim, USA, Nov. 15-22, 2015, pages.
Huawei, et al., "On MTC SIB transmission," 3GPP TSG RAN WG1 Meeting #83, R1-156917, Anaheim, USA, Nov. 15-22, 2015, 4 pages.
Nokia Networks, "SIB Transmission for MTC," 3GPP TSG-RAN WG1 Meeting #83, R1-156650, Anaheim, USA, Nov. 15-22, 2015, 4 pages.
Ericsson, "System information transmission for MTC," 3GPP TSG RAN WG1 Meeting #83, R1-156419, Anaheim, USA, Nov. 15-22, 2015, 6 pages.
Intel Corporation, "Multiple carrier operation for NB-IoT," 3GPP TSG RAN WG2 NB-IoT Ad-Hoc Meeting, R2-160501, Budapest, Hungary, Jan. 19-21, 2016, 2 pages.
Intel Corporation, "On System Operation and Common Control Messages for NB-IoT," 3GPP TSG RAN WG1 NB-IoT Ad-Hoc Meeting, R1-160134, Budapest, Hungary, Jan. 18-20, 2016, 4 pages.
Huawei, et al., "System information transmission," 3GPP TSG RAN WG1 NB-IoT Ad-Hoc Meeting, R1-160030, Budapest, Hungary, Jan. 18-20, 2016, 2 pages.
Extended European Search Report in EP Patent Application No. 21165661.6, dated Sep. 6, 2021, 5 pages.

* cited by examiner

SYSTEM INFORMATION TRANSMISSION METHOD AND DEVICE

TECHNICAL FIELD

The disclosure relates, but is not limited, to the field of mobile communication techniques.

BACKGROUND

In a long term evolution (LTE) system, before accessing a cell, user equipment (UE) needs to first acquire system information of the cell to know how the cell is configured, so as to work correctly in the cell. The cell sends, through a broadcast control channel (BCCH) as a logical channel, system information to all the UE in the cell. The BCCH as the logical channel is mapped to a broadcast channel (BCH) as a transport channel and a downlink share channel (DL-SCH) as a transport channel. The BCH is only used for transmitting master information block (MIB) information, and is mapped to a physical broadcast channel (PBCH). The DL-SCH is used for transmitting various system information block (SIB) information, and is mapped to a physical downlink shared channel (PDSCH) as a physical channel. The PBCH of the LTE is used for one transmission every 10 ms, so an overhead is high and flexibility is poor.

The UE may acquire the following information by detecting the PBCH.

(1) A downlink system bandwidth of the cell, a physical hybrid automatic repeat request indicator channel (PHICH) configuration, and a system frame number (SFN) may be known through the received MIB.

(2) The number of cell-specific antenna ports, which is 1, 2, or 4.

(3) A transmit-diversity scheme which is used for an L1/L2 control signal, and the transmit-diversity scheme includes a physical control format indicator channel (PCFICH), the PHICH, and a physical downlink control channel (PDCCH). Both the PBCH and the L1/L2 control signal may only use a single antenna transmission or transmission diversity. If the transmission diversity is used, the PBCH and the L1/L2 control signal use the same multiple antenna transmit-diversity scheme.

With the rise of intelligent terminals and the richness of wireless data application services, the number of data users in a wireless communication system has increased significantly, and data contents are no longer limited to texts or images in the related art. In future, users have increasing demands on multimedia services including high definition videos and mobile TV and the like, which causes an explosive growth of wireless network traffic. According to a forecast made by a market institute, in the next ten years, wireless data services will increase by 500-1000 times with average annual increase of 1.6-2 times, which has a higher requirement on network capacity of the wireless communication system.

Facing 2020 and the future, services of the mobile internet and the internet of things will become a key driving force for the development of mobile communications. A 5th Generation (5G) Mobile Communication will meet diverse service requirements of people on various areas, such as residence, work, leisure and transportation. Even in scenarios of dense residential areas, offices, stadiums, open-air gatherings, subways, expressways, high-speed trains, wide-area coverage and the like which have characteristics of ultrahigh traffic density, ultrahigh connection density and ultrahigh mobility, the 5G may also provide the users with extreme service experiences including ultra-high definition videos, virtual reality, augmented reality, cloud desktops, online games. Moreover, the 5G will permeate into the internet of things and various industry domains, and deeply integrate with industrial facilities, medical instruments, vehicles and the like, thereby effectively satisfying the diverse service requirements of vertical industries including industry, medical treatment, transportation and the like, and achieving real "internet of everything".

The 5G will solve challenges brought by differential performance indexes in diverse application scenarios. Performance challenges that different application scenarios face are different, User experience rate, traffic density, delay, energy efficiency and the number of connections all may become challenge indexes in different scenarios. Four main technical scenarios in the 5G, including continuous wide area coverage, high capacity of hotspot, low power consumption and large connection, and low delay and high reliability, may be summarized from the main application scenarios, service requirements and challenges of the mobile internet and the internet of things.

There are multiple manners for satisfying the requirements in the 5G, which mainly include that improving a spectral efficiency, increasing a network density, increasing a system bandwidth, intelligent service offload, reducing a system broadcast control overhead and the like. Reducing the system broadcast control overhead needs to flexibly adapt to different service requirements in the 5G and to meet "forward compatibility" consideration of a system design, if a mechanism related to the LTE is still adopted, the requirement may not be satisfied.

SUMMARY

The following is a summary of the subject matter elaborated in the disclosure. The summary is not intended to limit the scope of protection of the claims.

The disclosure provides a system information transmission method and device, so as to solve the problem of large overhead and poor compatibility in the related art.

A method for sending system information, the method is applied to a first communication node, and the method includes that first system information is generated, the first system information is indicative of indication information corresponding to second system information, and the second system information is used for assisting a second communication node to access a system; and the first system information is sent to the second communication node.

Optionally, the indication information includes at least one of the followings: whether the second system information is information sent on a carrier frequency of the first system information; period information of the second system information; update indication information of the second system information; carrier frequency information used for sending the second system information; time at which the second system information is sent; a frequency-domain resource used for sending the second system information; a time-domain resource used for sending the second system information; a data format of the second system information; a frequency-domain subcarrier spacing used for sending the second system information; a waveform used for sending the second system information; or correspondences between the first system information and the second system information.

Optionally, the first system information includes a transmission period of the first system information.

Optionally, a transmission period of the first system information is less than a transmission period of the second system information.

Optionally, the second system information includes at least one of the followings: one or more types, a transmission period of the second system information, a transmission period of the first system information on one or more carrier frequencies, information of one or more sets of access parameters, or communication carrier frequency information of the second system information.

A method for receiving system information, the method is applied to a second communication node, and the method includes that first system information sent by a first communication node is received; second system information is received according to indication information of the first system information; and a system is accessed according to the second system information.

Optionally, the system is accessed according to the second system information includes that a parameter for accessing the system is determined from the second system information according to a type of the second communication node, and the system is accessed according to the parameter; or a set of access parameters for accessing the system is determined from the second system information according to a type of the second communication node, and the system is accessed according to the set of access parameters.

Optionally, the indication information includes at least one of the followings: whether the second system information is information sent on a carrier frequency of the first system information; period information of the second system information; update indication information of the second system information; carrier frequency information used for sending the second system information; time at which the second system information is sent; a frequency-domain resource used for sending the second system information; a time-domain resource used for sending the second system information; a data format of the second system information; a frequency-domain subcarrier spacing used for sending the second system information; a waveform used for sending the second system information; or correspondences between the first system information and the second system information.

Optionally, the method further includes that after the first system information sent by the first communication node is received, a transmission period of the first system information is determined according to a time interval at which the first system information is successfully received.

A device for sending system information, the device is applied to a first communication node, and the device includes that a generating module, configured to generate first system information, the first system information is indicative of the indication information corresponding to second system information, and the second system information is used for assisting a second communication node to access a system; and a communication module, configured to send the first system information generated by the generating module to the second communication node.

A device for receiving system information, the device is applied to a second communication node, and the device includes that a first receiving module, configured to receive first system information sent by a first communication node; a second receiving module, configured to receive second system information according to indication information of the first system information received by the first receiving module; and an accessing module, configured to access a system according to the second system information received by the second receiving module.

Optionally, the accessing module includes at least one of a parameter unit or a set unit. The parameter unit is configured to determine, from the second system information, a parameter for accessing the system according to a type of the second communication node, and access the system according to the parameter. The set unit is configured to determine, from the second system information, a set of access parameters for accessing the system according to a type of the second communication node, and access the system according to the set of access parameters.

Optionally, the device further includes a determining module, configured to determine a transmission period of the first system information according to a time interval at which the first system information is successfully received by the first receiving module.

In the system information transmission method and device according to embodiments of the disclosure, a first communication node generates first system information, and sends the first system information to a second communication node; after receiving the first system information, the second communication node receives second system information according to indication information of the first system information; and the second communication node accesses a system according to the second system information. The technical solutions according to the embodiments of the disclosure may reduce a system broadcast control overhead to flexibly adapt to requirements on different services in the 5G, and meet "forward compatibility" of a system design, thereby having good adaptability to different services.

Other aspects will be apparent after the accompanying drawings and detailed descriptions are read and understood.

DETAILED DESCRIPTION

Embodiments of the disclosure are elaborated below in combination with the accompanying drawings. It should be noted that the embodiments and the features in the embodiments of the disclosure can be arbitrarily combined with each other under the condition of no conflicts.

The operations illustrated in the flowcharts of the accompanying drawings may be executed in a computer system in accordance with a set of computer executable instructions. Moreover, although a logical sequence is illustrated in the flowcharts, in some cases, the illustrated or described operations can be performed in a sequence different from that described here.

Figure 1:
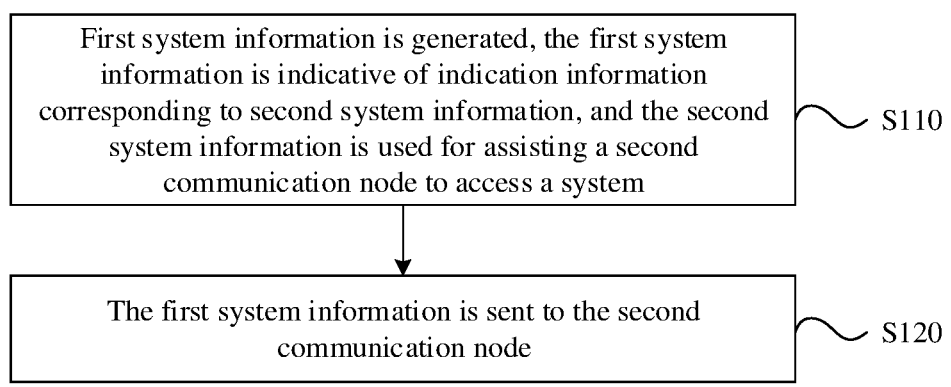
FIG. 1 is a flowchart of a method for sending system information according to an embodiment of the disclosure.

FIG. 1 illustrates a flowchart of a method for sending system information according to an embodiment of the disclosure. The method according to the embodiment is applied to a first communication node, and may include the following operation S110-S120.

At S110, first system information is generated, the first system information is indicative of indication information corresponding to second system information, and the second system information is used for assisting a second communication node to access a system.

At S120, the first system information is sent to the second communication node.

In the embodiment of the disclosure, the first communication node sends the first system information to the second communication node. Optionally, the second system information may be sent by the first communication node or other communication nodes. For example, in a heterogeneous network, a macro base station sends the second system information and a micro base station only sends the first system information; or the macro base station sends the first system information and the second system information, the micro base station sends the first system information, and the first system information sent by different base stations may be different.

Optionally, in the embodiment of the disclosure, the first system information may be a synchronization signal, the synchronization signal carries different information combinations according to different synchronization sequences and/or resource mapping manners; or the first system information may also be a reference signal, the reference signal carries different information combinations according to different sequences and/or resource mapping manners. The first system information may be sent to the second communication node through a downlink channel of at least one of a 5G system, an LTE system, a wideband code division multiple access (WCDMA) system, a global system for mobile communication (GSM) system, or a system adopting the standard 802.11. The second system information may be sent to the second communication node through the downlink channel of at least one of the 5G system, the LTE system, the WCDMA system, the GSM system, or the system adopting the standard 802.11.

Optionally, in the embodiment of the disclosure, the indication information corresponding to the second system information may include at least one of the followings: whether the second system information is information sent on a carrier frequency of the first system information; period information of the second system information; update indication information of the second system information; carrier frequency information used for sending the second system information; time at which the second system information is sent; a frequency-domain resource used for sending the second system information; a time-domain resource used for sending the second system information; a data format of the second system information; a frequency-domain subcarrier spacing used for sending the second system information; a waveform used for sending the second system information; or correspondences between the first system information and the second system information.

Optionally, in the embodiment of the disclosure, the first system information may include a transmission period of the first system information.

Optionally, in the embodiment of the disclosure, a transmission period of the first system information is less than a transmission period of the second system information.

Optionally, in the embodiment of the disclosure, a transmission period of the first system information may be configured.

Optionally, in the embodiment of the disclosure, the number of bits of the second system information is greater than the number of bits of the first system information.

Optionally, in the embodiment of the disclosure, the second system information includes at least one of the followings: one or more types, a transmission period of the second system information, a transmission period of the first system information on one or more carrier frequencies, information of one or more sets of access parameters, or communication carrier frequency information of the second system information.

In the embodiment of the disclosure, the second communication node may select, according to a type of the second communication node, the second system information applicable to the second communication node, so as to access the first communication node.

Figure 2:
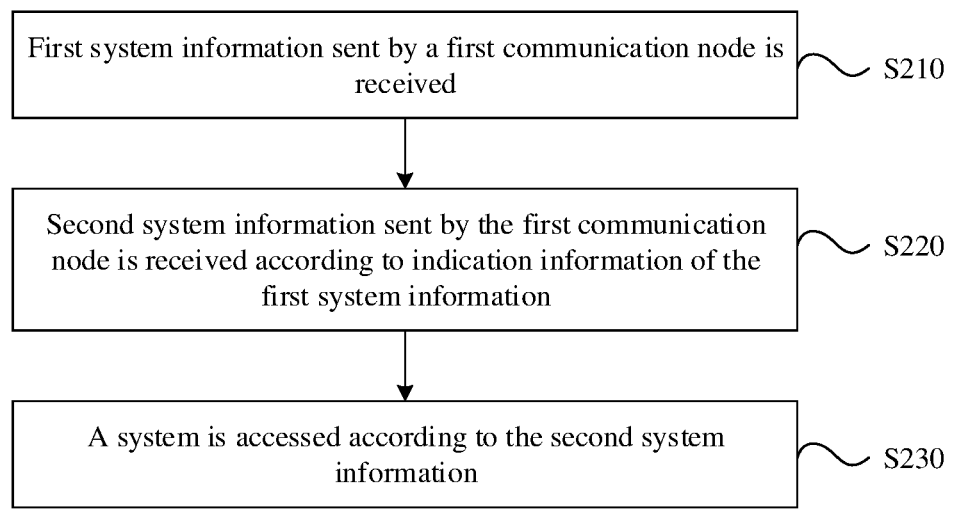
FIG. 2 is a flowchart of a method for receiving system information according to an embodiment of the disclosure.

FIG. 2 illustrates a flowchart of a method for receiving system information according to an embodiment of the disclosure. The method according to the embodiment of the disclosure is applied to a second communication node, and may include the following operations S210-S230.

At S210, first system information sent by a first communication node is received.

At S220, second system information sent by the first communication node is received according to indication information of the first system information.

At S230, a system is accessed according to the second system information.

Optionally, in the embodiment of the disclosure, an implementation of accessing the system according to the second system information may include that a parameter for accessing the system is determined from the second system information according to a type of the second communication node, and the system is accessed according to the parameter; or a set of access parameters for accessing the system is determined from the second system information according to a type of the second communication node, and the system is accessed according to the set of access parameters.

Optionally, in the embodiment of the disclosure, the indication information includes at least one of the followings: whether the second system information is information sent on a carrier frequency of the first system information; period information of the second system information; update indication information of the second system information; carrier frequency information used for sending the second system information; time at which the second system information is sent; a frequency-domain resource used for sending the second system information; a time-domain resource used for sending the second system information; a data format of the second system information; a frequency-domain subcarrier spacing used for sending the second system information; a waveform used for sending the second system information; or correspondences between the first system information and the second system information.

The indication information in the embodiment of the disclosure may be carried explicitly or implicitly. For example, the indication information is implicitly determined according to a transmission period of the first system information, a format of the first system information, and so on.

Optionally, after S210, the method according to the embodiment of the disclosure may also include that a transmission period of the first system information is determined according to a time interval at which the first system information is successfully received.

In the embodiment of the disclosure, after the second communication node determines the transmission period of the first system information, the second communication node may periodically receive the first system information.

Figure 3:
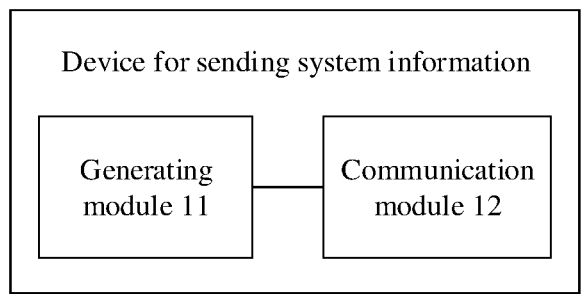
FIG. 3 is a structure diagram of a device for sending system information according to an embodiment of the disclosure.

FIG. 3 illustrates a structure diagram of a device for sending system information according to an embodiment of the disclosure. The device according to the embodiment of the disclosure is applied to a first communication node, and may include a generating module 11 and a communication module 12.

The generating module 11 is configured to generate first system information, the first system information is indicative of indication information corresponding to second system information, and the second system information is used for assisting a second communication node to access a system.

The communication module 12 is configured to send the first system information generated by the generating module 11 to the second communication node.

Figure 4:
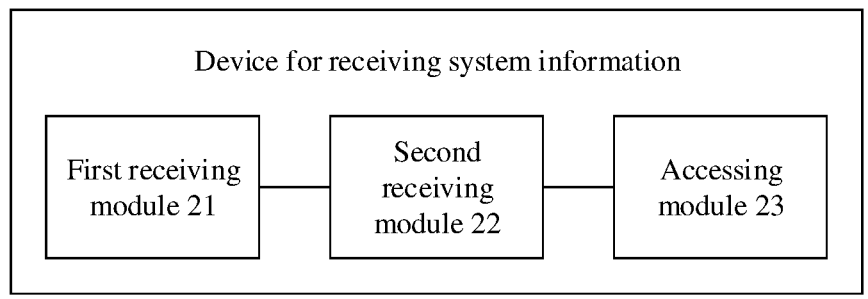
FIG. 4 is a structure diagram of a device for receiving system information according to an embodiment of the disclosure.

FIG. 4 illustrates a structure diagram of a device for receiving system information according to an embodiment of the disclosure. The device according to the embodiment of the disclosure is applied to a second communication node, and may include a first receiving module 21, a second receiving module 22 and an accessing module 23.

The first receiving module 21 is configured to receive first system information sent by a first communication node.

The second receiving module 22 is configured to receive second system information according to indication information of the first system information received by the first receiving module 21.

The accessing module 23 is configured to access a system according to the second system information received by the second receiving module 22.

Figure 5:
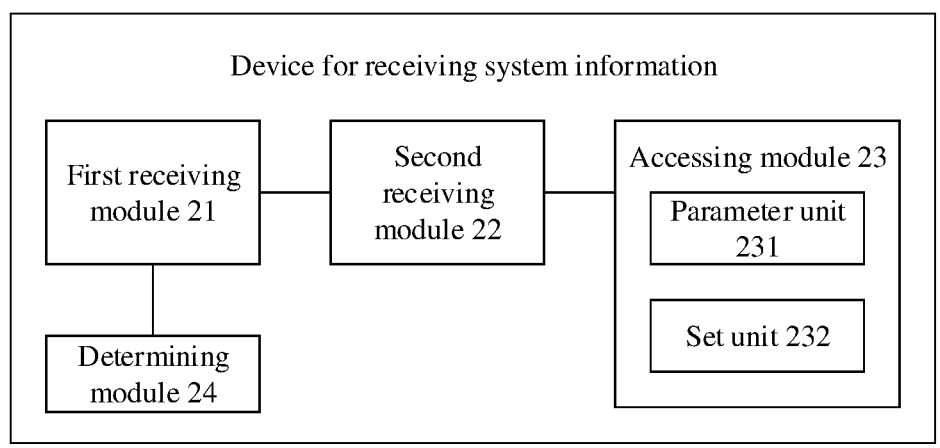
FIG. 5 is a structure diagram of another device for receiving system information according to an embodiment of the disclosure.

Optionally, FIG. 5 is a structure diagram of another device for receiving system information according to an embodiment of the disclosure. Based on the structure of the device illustrated in FIG. 4, the accessing module 23 may include at least one of a parameter unit 231 or a set unit 232. FIG. 5 is illustrated by taking that the accessing module 23 includes the parameter unit 231 and the set unit 232 for an example.

Herein, the parameter unit 231 is configured to determine, from the second system information, a parameter for accessing the system according to a type of the second communication node, and access the system according to the parameter.

The set unit 232 is configured to determine, from the second system information, a set of access parameters for accessing the system according to a type of the second communication node, and access the system according to the set of access parameters.

Optionally, the device according to the embodiment of the disclosure may also include a determining module 24.

The determining module 24 is configured to determine a transmission period of the first system information according to a time interval at which the first system information is successfully received by the first receiving module 21.

The system information transmission method according to the embodiments of the disclosure is elaborated below through some embodiments. A first communication node in the following embodiments is, for example, a base station, and a second communication node is, for example, a terminal.

First Embodiment

As illustrated in FIG. 1, a base station generates first system information.

Figure 6:
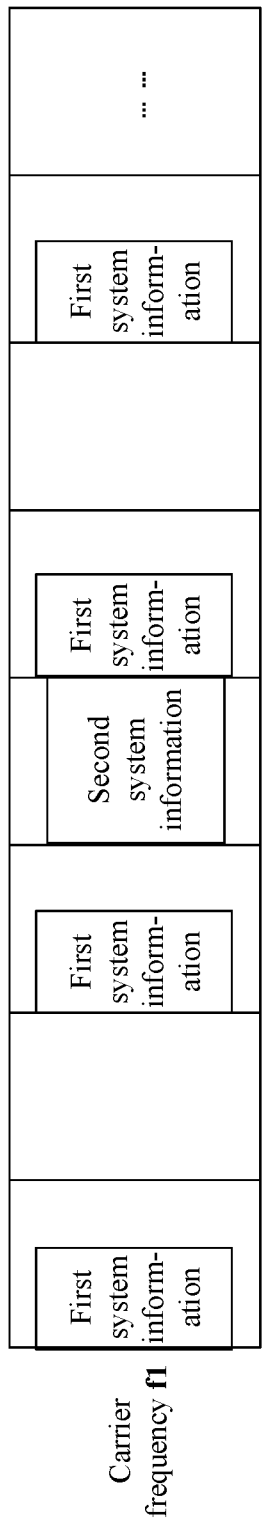
FIG. 6 is a schematic diagram of a relationship between the first system information and the second system information in the method for sending system information according to an embodiment of the disclosure.

The base station sends the first system information on a carrier frequency f1. Herein, the first system information indicates whether second system information is sent on the carrier frequency f1. FIG. 6 illustrates a schematic diagram of a relationship between the first system information and the second system information in the method for sending system information according to an embodiment of the disclosure. Herein the first system information indicates that the second system information is sent on the carrier frequency f1.

A terminal receives the first system information on the carrier frequency f1, and receives, according to indication information of the first system information, the second system information from the base station and/or other base stations on the carrier frequency f1.

The terminal accesses the base station or other base stations in a wireless communication system according to the second system information.

Second Embodiment

As illustrated in FIG. 1, a base station generates first system information.

Figure 7:
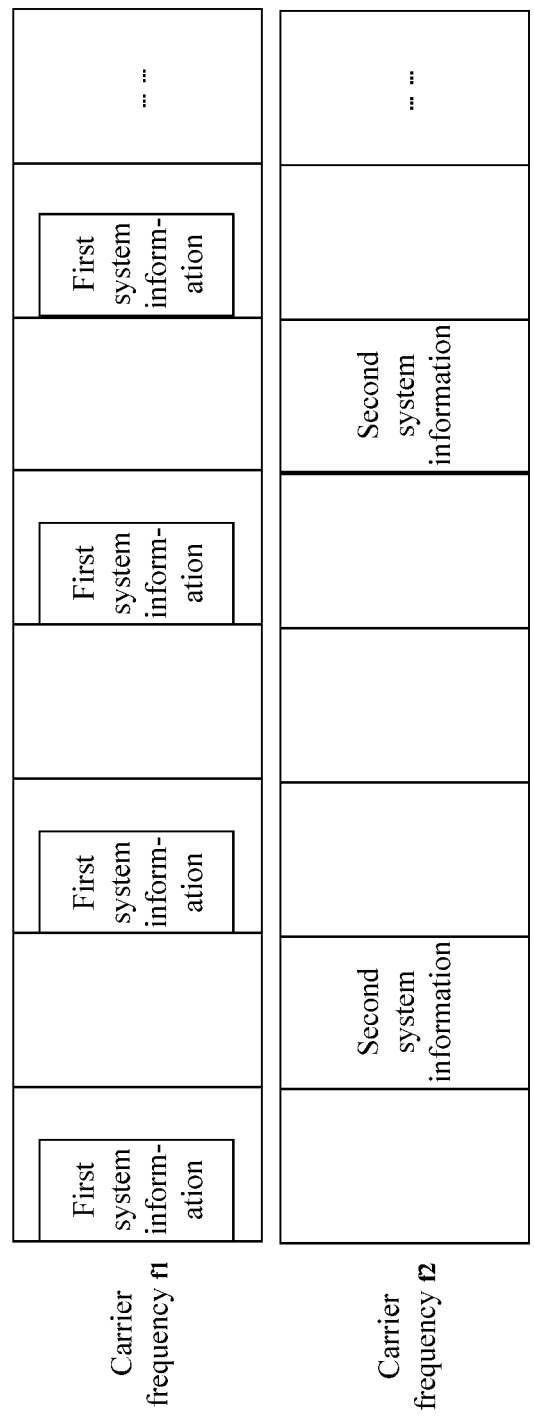
FIG. 7 is a schematic diagram of a relationship between the first system information and the second system information in the method for sending system information according to an embodiment of the disclosure.

The base station sends the first system information on a carrier frequency f1. Herein, the first system information indicates a transmission period of second system information, and the second system information may be sent on either the carrier frequency f1 (as illustrated in FIG. 6) or other carrier frequencies. FIG. 7 illustrates a schematic diagram of a relationship between the first system information and the second system information in the method for sending system information according to an embodiment of the disclosure.

A terminal receives the first system information on the carrier frequency f1, and receives, according to indication information of the first system information, the second system information from the base station and/or other base stations on the carrier frequency f1.

The terminal accesses the base station or other base stations in a wireless communication system according to the second system information.

Third Embodiment

As illustrated in FIG. 1, a base station generates first system information.

The base station sends the first system information on a carrier frequency f1. Herein, the first system information indicates an update situation of second system information, and the second system information may be sent on either the carrier frequency f1 or other carrier frequencies. The update situation may be represented by X bit(s). For example, when the X is one bit, the X is assumed as 0; when the second system information needs to be updated, the X becomes 1; when the system information is updated again, the X becomes 0, and so on.

Optionally, in the embodiment, first system information between updated second system information and adjacent un-updated second system information should be adjusted according to the updated second system information. For example, when the X is one bit, the X is assumed as 0; when the second system information needs to be updated, the X in the first system information between the updated second system information and the adjacent un-updated second system information becomes 1. An advantage of processing in such a manner is that the terminal which has acquired the second system information knows in advance whether the follow-up second system information is updated; if the follow-up second system information is not updated, the terminal may not receive the follow-up second system information; if the follow-up second system information is updated, the terminal needs to receive the updated second system information, thereby achieving the objective of saving electrical power of the terminal.

Fourth Embodiment

As illustrated in FIG. 1, a base station generates first system information.

The base station sends the first system information on a carrier frequency f1. Herein, the first system information indicates one or more carrier frequencies for sending second system information. For example, the second system information may be sent on either a carrier frequency f2 (as illustrated in FIG. 7) or multiple carrier frequencies (e.g. the carrier frequency f2 and a carrier frequency f3).

A terminal receives the first system information on the carrier frequency f1, and receives, according to indication information of the first system information, the second system information from the base station and/or the other base stations on the carrier frequency f2, or receives, according to indication information of the first system information, the second system information from the base station and/or the other base stations on the carrier frequency f2 and the carrier frequency f3.

The terminal accesses the base station or other base stations in a wireless communication system according to the second system information.

Fifth Embodiment

As illustrated in FIG. 1, a base station generates first system information.

The base station sends the first system information on a carrier frequency f1. Herein, the first system information indicates time at which second system information is sent, and the second system information may be sent on either the carrier frequency f1 or other carrier frequencies.

The terminal receives the first system information on the carrier frequency f1, and receives, according to indication information of the first system information, the second system information from the base station and/or other base stations on the carrier frequency f1 or other carrier frequencies.

The terminal accesses the base station or other base stations in a wireless communication system according to the second system information.

Sixth Embodiment

As illustrated in FIG. 1, a base station generates first system information.

The base station sends the first system information on a carrier frequency f1. Herein, the first system information indicates a frequency-domain resource for sending second system information. For example, the frequency-domain resource used for the second system information is greater than or equal to a frequency-domain resource used for the first system information.

A terminal receives the first system information on the carrier frequency f1, and receives, according to the frequency-domain resource indicated by the first system information, the second system information sent by the base station and/or other base stations.

The terminal accesses the base station or other base stations in a wireless communication system according to the second system information.

Seventh Embodiment

As illustrated in FIG. 1, a base station generates first system information.

The base station sends the first system information on a carrier frequency f1. Herein, the first system information indicates a duration required for one transmission of complete second system information, and the second system information may be sent on either the carrier frequency f1 or other carrier frequencies.

Figure 8:
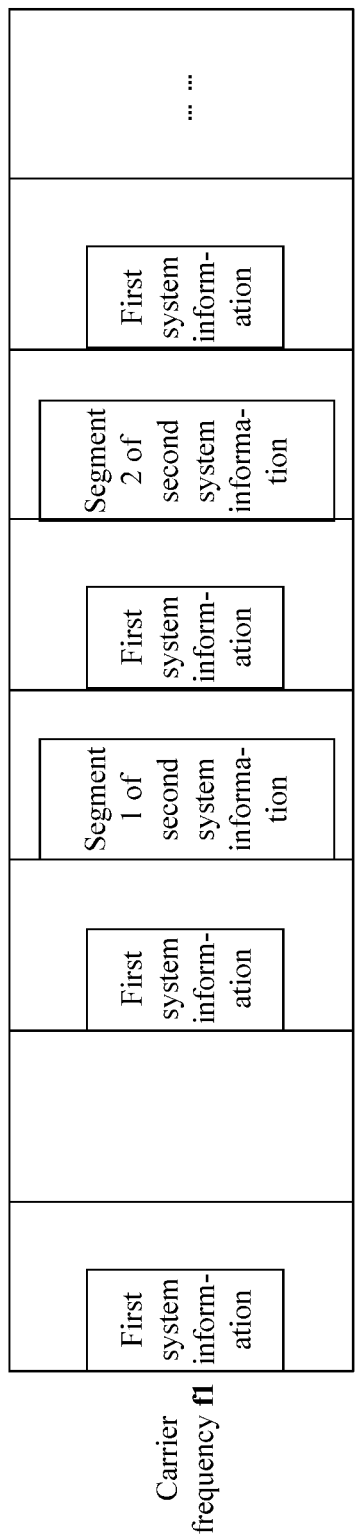
FIG. 8 is a schematic diagram of a relationship between the first system information and the second system information in the method for sending system information according to an embodiment of the disclosure.

Optionally, in the embodiment, the duration of the complete second system information is a duration of the second system information when the terminal may successfully acquire the second system information under an ideal channel condition (no interference, no noise and channel known), and the duration may be either continuous in time or discrete in time. FIG. 8 illustrates a schematic diagram of a relationship between the first system information and the second system information in the method for sending system information according to an embodiment of the disclosure. Herein the terminal may acquire the complete second system information by successfully receiving a segment 1 and a segment 2 discretely sent in time.

Eighth Embodiment

As illustrated in FIG. 1, a base station generates first system information.

The base station sends the first system information on a carrier frequency f1. Herein, the first system information indicates a data format of second system information. For example, the second system information has Y data formats, and the first system information indicates which data format the second system information belongs to. Optionally, in the embodiment, different data formats may be divided based on at least one of a bit length, a modulation and coding scheme, a combination of time-frequency resource occupation, a service type, a carrier frequency, or a protocol version.

A terminal receives the first system information on the carrier frequency f1, and receives, according to indication information of the first system information, the second system information from the base station and/or other base stations on the carrier frequency f1 or other carrier frequencies.

The terminal accesses the base station or other base stations in a wireless communication system according to the second system information.

Ninth Embodiment

As illustrated in FIG. 1, a base station generates first system information.

The base station sends the first system information on a carrier frequency f1. Herein, the first system information indicates a frequency-domain subcarrier spacing used for sending the second system information, and the frequency-domain subcarrier spacing may be the same as a frequency-domain subcarrier spacing used for sending the first system, or may be different from a frequency-domain subcarrier spacing used for sending the first system information.

A terminal receives the first system information on the carrier frequency f1, and receives, according to the frequency-domain subcarrier spacing indicated by the first system information, the second system information sent by the base station and/or other base stations.

The terminal accesses the base station or other base stations in a wireless communication system according to the second system information.

Tenth Embodiment

As illustrated in FIG. 1, a base station generates first system information.

The base station sends the first system information on a carrier frequency f1. Herein, the first system information indicates a waveform used for sending the second system information. Optionally, the waveform may be either an orthogonal multiple access mode or a non-orthogonal multiple access mode.

A terminal receives the first system information on the carrier frequency f1, and receives, according to indication information of the first system information, the second system information sent by the base station and/or other base stations.

The terminal accesses the base station or other base stations in a wireless communication system according to the second system information.

Eleventh Embodiment

As illustrated in FIG. 1, a base station generates first system information.

Figure 9:
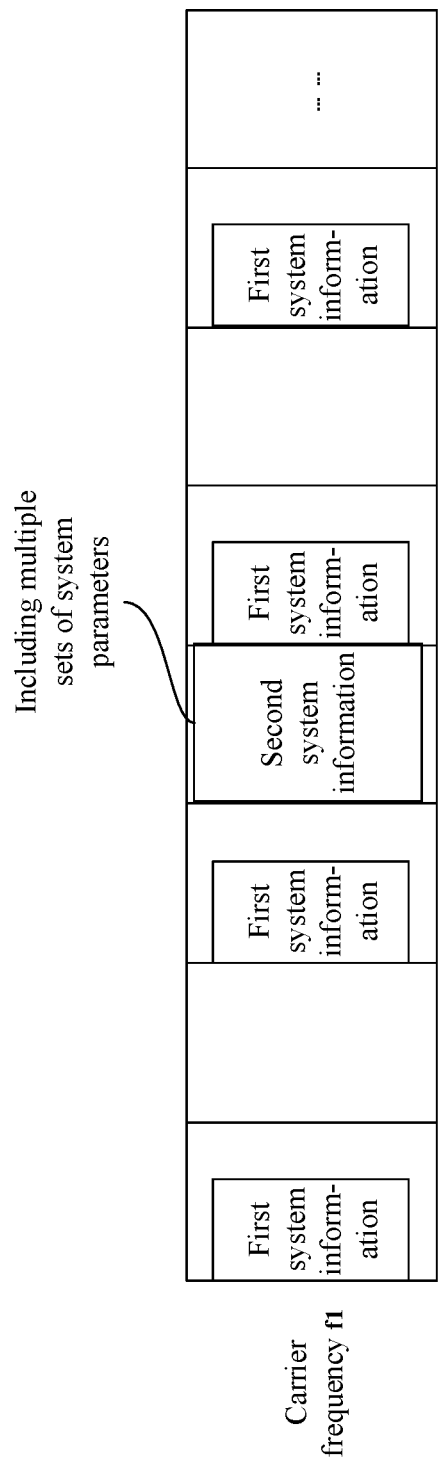
FIG. 9 is a schematic diagram of a relationship between the first system information and the second system information in the method for sending system information according to an embodiment of the disclosure.

The base station sends the first system information on a carrier frequency f1. Herein, the first system information indicates correspondences between the first system information and second system information. FIG. 9 illustrates a schematic diagram of a relationship between the first system information and the second system information in the method for sending system information according to an embodiment of the disclosure. The second system information includes Y sets of access parameters, and the first system information indicates that Z sets of access parameters in the Y sets of access parameters may be applied to the carrier frequency f1, herein the Z is greater than or equal to 1, and is less than Y.

A terminal receives the first system information on the carrier frequency f1, and receives, according to indication information of the first system information, the second system information sent by the base station and/or other base stations.

The terminal determines, from the Y sets of access parameters, a set of access parameters for accessing the base station, and accesses the base station according to the set of access parameters.

Twelfth Embodiment

As illustrated in FIG. 1, a base station generates first system information.

Figure 10:
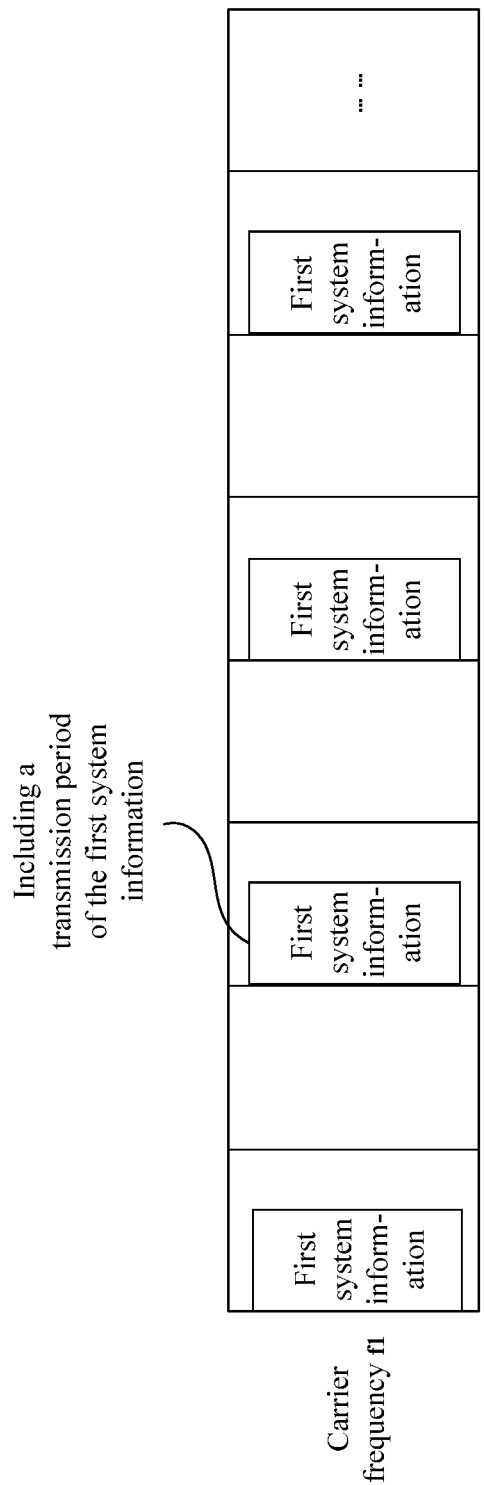
FIG. 10 is a schematic diagram of sending of the first system information in the method for sending system information according to an embodiment of the disclosure.

The base station sends the first system information on a carrier frequency f1. FIG. 10 illustrates a schematic diagram of a relationship between the first system information and the second system information in the method for sending system information according to an embodiment of the disclosure. Herein the first system information includes a transmission period of the first system information.

A terminal receives the first system information on a carrier frequency f1, and receives, according to indication information of the first system information, second system information sent by the base station and/or other base stations.

The terminal accesses the base station or other base stations in a wireless communication system according to the second system information.

The advantage of the embodiment is to provide enough flexibility for the forward compatibility design of the system, thereby avoiding the problem of limitation to a follow-up design due to a fixed transmission period of the first system information.

Thirteenth Embodiment

As illustrated in FIG. 1, a base station generates first system information.

The base station sends the first system information. Herein, the first system information is indicative of indication information associated with second system information. Optionally, a transmission period of the first system information is less than a transmission period of the second system information.

A terminal receives the first system information, and receives, according to the indication information of the first system information, the second system information sent by the base station and/or other base stations.

The terminal accesses the base station or other base stations in a wireless communication system according to the second system information.

Fourteenth Embodiment

As illustrated in FIG. 1, a base station generates first system information.

The base station sends the first system information. Herein, the first system information indicates a type of second system information. Optionally, the base station informs, through the first system information, a terminal of the type of the second system information or types of corresponding second system information on different carrier frequencies.

The terminal receives the first system information, and receives, according to indication information of the first system information, the second system information sent by the base station and/or other base stations.

The terminal accesses the base station or other base stations in a wireless communication system according to the second system information.

Fifteenth Embodiment

As illustrated in FIG. 1, a base station generates first system information.

Figure 11:
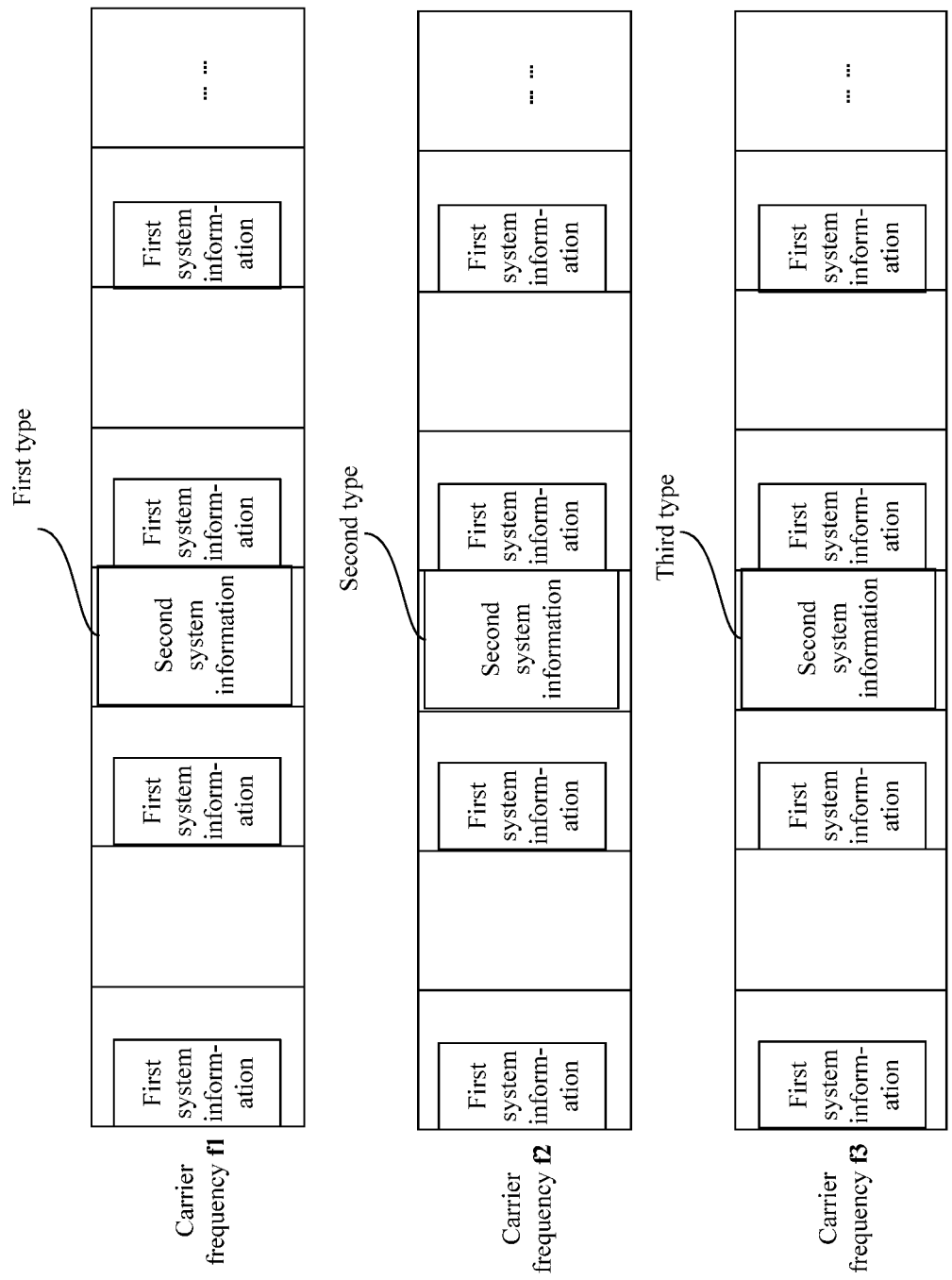
FIG. 11 is a schematic diagram of a relationship between the first system information and the second system information in the method for sending system information according to an embodiment of the disclosure.

The base station sends the first system information. Herein, the first system information indicates a type of second system information. Optionally, FIG. 11 is a schematic diagram of a relationship between the first system information and the second system information in the method for sending system information according to an embodiment of the disclosure. The base station informs, through the first system information, a terminal of the type of the second system information or types of corresponding second system information on different carrier frequencies.

The terminal which has received the first system information selects, according to a type of the terminal, the second system information applicable to the terminal. For example, there are three types of the second system information, which correspond to three types of services respectively, and the terminal receives corresponding second system information according to a service type of the terminal itself. For example, there are three types of the second system information, which correspond to three types of terminal respectively, and the terminal receives corresponding second system information according to a terminal type of the terminal.

Sixteenth Embodiment

As illustrated in FIG. 1, a base station generates first system information.

The base station sends the first system information. Herein, the first system information is indicative of indication information associated with second system information. Optionally, the second system information includes a transmission period of the second system information. For example, a value of the transmission period may be a set defined in a standard.

A terminal receives the first system information, and receives, according to the indication information of the first system information, the second system information sent by the base station and/or other base stations.

The terminal accesses the base station or other base stations in a wireless communication system according to the second system information.

Seventeenth Embodiment

As illustrated in FIG. 1, a base station generates first system information.

The base station sends the first system information. Herein, the first system information is indicative of indication information associated with second system information. Optionally, the second system information includes a transmission period of the first system information on X carrier frequencies. Herein, the X is an integer greater than 1. For example, the value of the transmission period may be a set defined in the standard.

A terminal receives the first system information, and receives, according to the indication information of the first system information, the second system information sent by the base station and/or other base stations.

The terminal accesses the base station or other base stations in a wireless communication system according to the second system information.

Eighteenth Embodiment

As illustrated in FIG. 1, a base station generates first system information.

Figure 12:
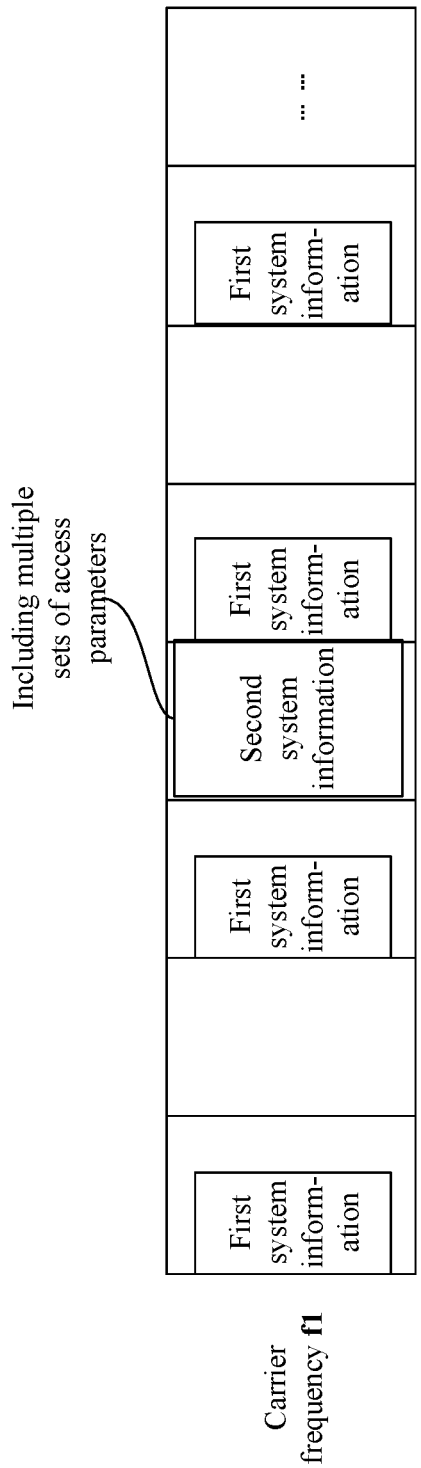
FIG. 12 is a schematic diagram of a relationship between the first system information and the second system information in the method for sending system information according to an embodiment of the disclosure.

The base station sends the first system information. Herein, the first system information is indicative of indication information associated with second system information. Optionally, FIG. 12 illustrates a schematic diagram of a relationship between the first system information and the second system information in the method for sending system information according to an embodiment of the disclosure. The second system information includes information of N sets of access parameters, here the N is an integer greater than or equal to 1.

A terminal receives the first system information, and receives, according to the indication information of the first system information, the second system information sent by the base station and/or other base stations.

The terminal accesses the base station or other base stations in a wireless communication system according to the second system information.

Nineteenth Embodiment

As illustrated in FIG. 1, a base station generates first system information.

The base station sends the first system information. Herein, the first system information is indicative of indication information associated with second system information. Optionally, the second system information includes information of N sets of access parameters, here the N is an integer greater than or equal to 1.

The terminal which has received the second system information selects, according to a type of the terminal, a set of access parameters applicable to the terminal.

Twentieth Embodiment

As illustrated in FIG. 1, a base station generates first system information.

The base station sends the first system information. Herein, the first system information is indicative of indication information associated with second system information.

Figure 13:
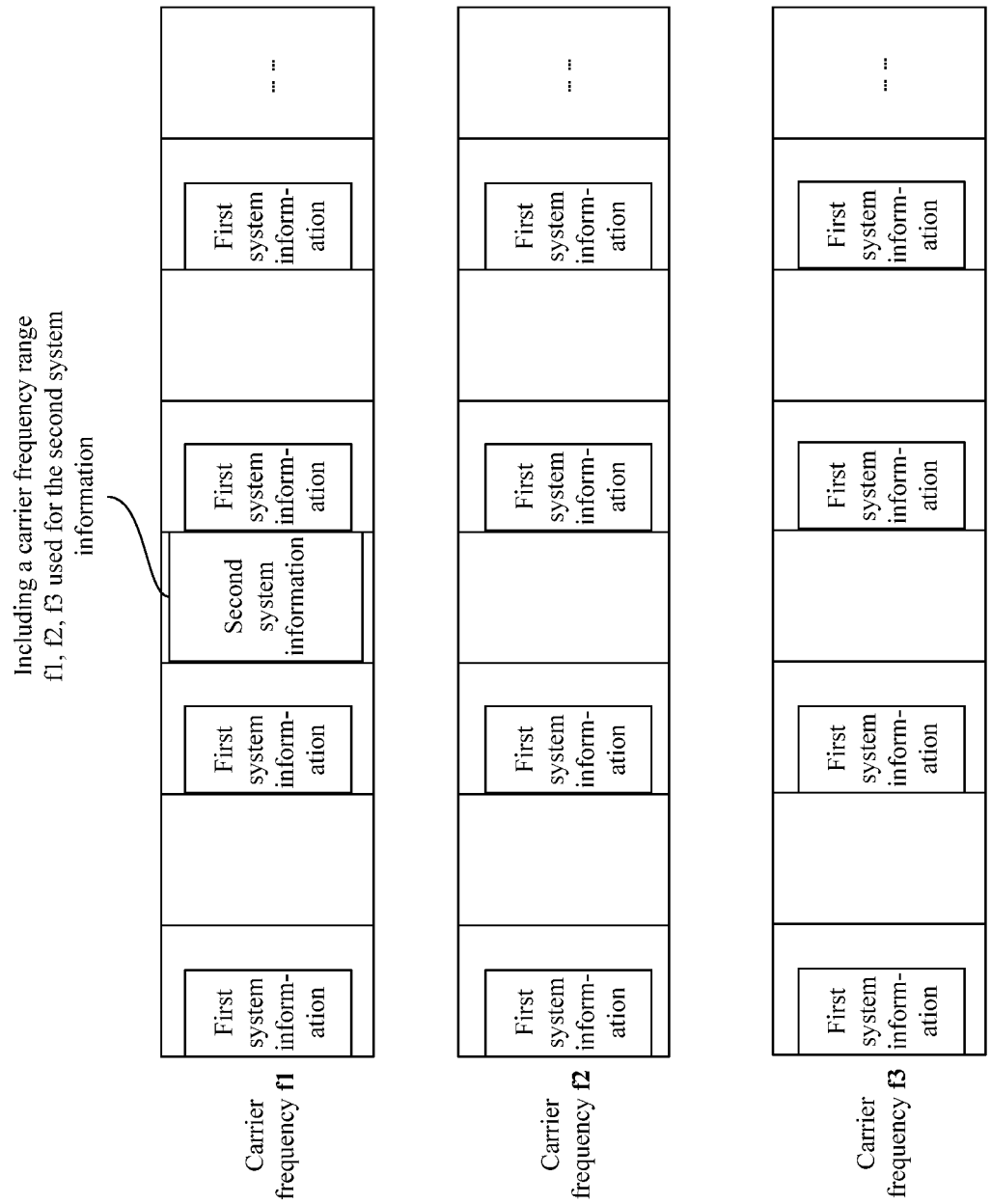
FIG. 13 is a schematic diagram of a relationship between the first system information and the second system information in the method for sending system information according to an embodiment of the disclosure.

Optionally, the second system information includes carrier frequency information used for sending the second system information. For example, FIG. 13 illustrates a schematic diagram of a relationship between the first system information and the second system information in the method for sending system information according to an embodiment of the disclosure. The base station informs, through the first system information, a terminal that the second system information may be used on carrier frequencies f1, f2 and f3, or informs a terminal that the second system information is prohibited from being used on carrier frequencies f4 and f5.

A terminal receives the first system information on the carrier frequencies f1, f2 and f3, and receives, according to the indication information of the first system information, the second system information sent by the base station and/or other base stations.

The terminal accesses the base station or other base stations in a wireless communication system according to the second system information.

Twenty-First Embodiment

As illustrated in FIG. 1, a base station generates first system information.

The base station sends the first system information. Herein, the first system information is indicative of indication information associated with second system information. Optionally, a transmission period of the first system information is configurable, and a terminal may determine, through a blind detection manner, the transmission period of the first system information or a transmission period of the second system information.

A terminal receives the first system information, and receives, according to the indication information of the first system information, the second system information sent by the base station and/or other base stations.

The terminal accesses the base station or other base stations in a wireless communication system according to the second system information.

Twenty-Second Embodiment

A base station generates first system information.

The base station sends the first system information. Herein, the first system information is indicative of indication information associated with second system information. Optionally, the number of useful data bits of the second system information is greater than the number of useful data bits of the first system information.

A terminal receives the first system information, and receives, according to the indication information of the first system information, the second system information sent by the base station and/or other base stations.

The terminal accesses the base station or other base stations in a wireless communication system according to the second system information.

Twenty-Third Embodiment

A terminal knows that there are N possible transmission periods of the first system information (e.g. it is determined by a standardized way that there are four possible transmission periods of the first system information including 1 ms, 2 ms, 5 ms and 10 ms), and the terminal determines a transmission period of the first system information according to a time interval at which the first system information is successfully received.

It should be noted that a communication node for sending first system information may be different from a communication node for sending second system information. For example, in a heterogeneous network, a macro base station sends the second system information, and a micro base station only sends the first system information; or a macro base station sends the first system information and the second system information, a micro base station sends the first system information, and the first system information sent by the different base stations may be different.

The first system information may be a synchronization signal, the synchronization signal carries different information combinations according to different synchronization sequences and/or resource mapping manners; or the first system information may also be a reference signal, the reference signal carries different information combinations according to different sequences and/or resource mapping manners. The first system information may be sent to a terminal through a downlink channel of at least one of a 5G system, a LTE system, a WCDMA system, a GSM system, or a system adopting the standard 802.11. The second system information may be sent to a terminal through a downlink channel of at least one of a 5G system, a LTE system, a WCDMA system, a GSM system, or a system adopting the standard 802.11.

Although the implementations according to the embodiments of the disclosure are as described above, contents disclosed in the embodiments are the implementations only adopted for facilitating understanding the technical solutions according to the embodiments of the disclosure, and not intended to limit the embodiments of the disclosure. Any skilled in the art may make any modification and change to forms and details of the embodiments without departing from the core technical solution disclosed by the embodiments of the disclosure, but the scope of protection limited by the disclosure is still subject to the scope limited by the claims attached.

Those of ordinary skill in the art may understand that all or a part of operations of the above embodiments may be performed by a flow of computer program. The computer program can be stored in a computer-readable storage medium, and is executed on corresponding hardware platforms (such as a system, equipment, an apparatus, and a device). When being executed, the computer program includes one or a combination of the operations in the embodiments of the method.

Optionally, all or a part of operations of the above embodiments may also be implemented by an integrated circuit. These operations may be made into integrated circuit modules separately; or multiple modules or operations of the above embodiments are made into a single integrated circuit module.

The apparatus/function module/function unit in the above embodiments may be realized by a general computing device. The apparatus/function module/function unit can be either integrated on a single computing device, or distributed on a network constituted by multiple computing devices.

When the apparatus/function module/function unit in the above embodiments are realized in form of software function module and sold or used as an independent product, the apparatus/function module/function unit can be stored in a computer-readable storage medium. The above mentioned computer-readable storage medium may be a read-only memory (ROM), a magnetic disk or a compact disk.

INDUSTRIAL APPLICABILITY

Through the embodiments of the disclosure, a first communication node generates first system information, and sends the first system information to a second communication node; after receiving the first system information, the second communication node receives second system information according to indication information of the first system information; and the second communication node accesses a system according to the second system information. The technical solutions according to the disclosure may reduce a system broadcast control overhead to flexibly adapt to the requirements on different services in the 5G, and meet "forward compatibility" of a system design, thereby having good adaptability to different services.

The invention claimed is:

1. A method for wireless communication, comprising:
transmitting, by a base station providing access to a cell, a first system information on a broadcast channel that is mapped to a Physical Broadcast Channel (PBCH) to a terminal device, the first system information carrying an indication information corresponding to a second system information, wherein the indication information includes a frequency-domain subcarrier spacing for transmitting the second system information to the terminal device; and
assisting, by the base station, the terminal device to access the cell provided by the base station using the second system information by transmitting the second system information to the terminal device according to the frequency-domain subcarrier spacing,
wherein the second system information comprises a transmission period of the first system information on a carrier frequency.

2. The method of claim 1, wherein the first system information on the broadcast channel comprises information about a reference signal associated with a resource mapping manner.

3. The method of claim 1, wherein the transmission period of the first system information is less than a transmission period of the second system information.

4. The method of claim 1, wherein the second system information comprises at least one of: one or more types, a transmission period of the second system information, information of one or more sets of access parameters, or communication carrier frequency information of the second system information.

5. A method for wireless communication, comprising:
receiving, by a terminal device from a base station providing access to a cell, a first system information on a broadcast channel that is mapped to a Physical Broadcast Channel (PBCH), the first system information carrying an indication information corresponding to a second system information, wherein the indication information includes a frequency-domain subcarrier spacing for receiving the second system information from the base station;
receiving, by the terminal device, the second system information according to the frequency-domain subcarrier spacing; and
accessing the cell provided by the base station according to the second system information;
wherein the second system information comprises a transmission period of the first system information on a carrier frequency.

6. The method of claim 5, wherein accessing the cell according to the second system information comprises:
determining, from the second system information, a parameter for accessing the cell according to a type of the terminal device, and accessing the cell according to the parameter; or
determining, from the second system information, a set of access parameters for accessing the cell according to a type of the terminal device, and accessing the cell according to the set of access parameters.

7. The method of claim 5, further comprising: after receiving the first system information sent by the base station, determining the transmission period of the first system information according to a time interval at which the first system information is successfully received.

8. The method of claim 5, wherein the second system information comprises at least one of: one or more types, a transmission period of the second system information, information of one or more sets of access parameters, or communication carrier frequency information of the second system information.

9. The method of claim 5, wherein the first system information on the broadcast channel comprises information about a reference signal associated with a resource mapping manner.

10. The method of claim 5, wherein the transmission period of the first system information is less than a transmission period of the second system information.

11. A device for providing access to a cell for wireless communication, comprising:
a processor; and
a memory storing instructions executable by the processor;
wherein the processor is configured to:
transmit a first system information on a broadcast channel that is mapped to a Physical Broadcast Channel (PBCH) to a terminal device, the first system information carrying an indication information corresponding to a second system information, wherein the indication information includes a frequency-domain subcarrier spacing for transmitting the second system information to the terminal device; and
assist the terminal device to access the cell using the second system information by transmitting the second system information to the terminal device according to the frequency-domain subcarrier spacing,
wherein the second system information comprises a transmission period of the first system information on a carrier frequency.

12. The device of claim 11, wherein the first system information on the broadcast channel comprises information about a reference signal associated with a resource mapping manner.

13. The device of claim 11, wherein the transmission period of the first system information is less than a transmission period of the second system information.

14. The device of claim 11, wherein the second system information comprises at least one of: one or more types, a transmission period of the second system information, information of one or more sets of access parameters, or communication carrier frequency information of the second system information.

15. A device for wireless communication, comprising:
a processor; and
a memory storing instructions executable by the processor;
wherein the processor is configured to:
receive, from a base station providing access to a cell, a first system information on a broadcast channel that is mapped to a Physical Broadcast Channel (PBCH), the first system information carrying an indication information corresponding to a second system information, wherein the indication information includes a frequency-domain subcarrier spacing for receiving the second system information from the base station;

receive the second system information according to the frequency-domain subcarrier spacing; and access the cell provided by the base station according to the second system information;

wherein the second system information comprises a transmission period of the first system information on a carrier frequency.

16. The device of claim 15, wherein the processor is further configured to:

determine, from the second system information, a parameter for accessing the cell according to a type of the device, and access the cell according to the parameter; or determine, from the second system information, a set of access parameters for accessing the cell according to a type of the device, and access the cell according to the set of access parameters.

17. The device of claim 15, the processor is further configured to determine the transmission period of the first system information according to a time interval at which the first system information is successfully received.

18. The device of claim 15, wherein the second system information comprises at least one of: one or more types, a transmission period of the second system information, information of one or more sets of access parameters, or communication carrier frequency information of the second system information.

19. The device of claim 15, wherein the first system information on the broadcast channel comprises information about a reference signal associated with a resource mapping manner.

20. The device of claim 15, wherein the transmission period of the first system information is less than a transmission period of the second system information.

* * * * *